United States Patent
Tzou

(10) Patent No.: US 11,558,138 B2
(45) Date of Patent: Jan. 17, 2023

(54) ROBUST METHOD AND DEVICE FOR ESTIMATING FREQUENCY OFFSET IN ORTHOGONAL FREQUENCY DIVISION MULTIPLEXING COMMUNICATION

(71) Applicant: HANGZHOU VANGO TECHNOLOGIES, INC., Hangzhou (CN)

(72) Inventor: Ching-Kae Tzou, Hangzhou (CN)

(73) Assignee: HANGZHOU VANGO TECHNOLOGIES, INC., Hangzhou (CN)

( * ) Notice: Subject to any disclaimer, the term of this patent is extended or adjusted under 35 U.S.C. 154(b) by 0 days.

(21) Appl. No.: 17/564,162

(22) Filed: Dec. 28, 2021

(65) Prior Publication Data
US 2022/0123851 A1    Apr. 21, 2022

(30) Foreign Application Priority Data

Sep. 14, 2021 (CN) .......................... 202111072870.6

(51) Int. Cl.
*H04J 11/00* (2006.01)
(52) U.S. Cl.
CPC ................. *H04J 11/0023* (2013.01)
(58) Field of Classification Search
CPC .............. H04J 11/0023; H04L 27/2656; H04L 27/266; H04L 27/2672; H04L 27/2675; H04L 27/2695; H04L 27/2659; H04L 27/26524
USPC ........................................... 375/260
See application file for complete search history.

(56) References Cited

U.S. PATENT DOCUMENTS

| | | | |
|---|---|---|---|
| 10,439,780 B2* | 10/2019 | Park | H04L 5/0023 |
| 2016/0119174 A1* | 4/2016 | Chavali | H04L 27/2672 370/252 |

OTHER PUBLICATIONS

IEEE, "IEEE Standard for Low-Rate Wireless Networks," in IEEE Std 802.15.4-2015 (Revision of IEEE Std 802.15.4-2011), Apr. 2016, pp. 1-708.
(Continued)

*Primary Examiner* — Don N Vo
(74) *Attorney, Agent, or Firm* — JCIP Global Inc.

(57) ABSTRACT

Disclosed are a robust method and device for estimating frequency offset in orthogonal frequency division multiplexing communication. The method includes: performing frequency-domain cyclic shift cross-correlation on preprocessed signal sequences with a short training field sequence in multiple symbol periods respectively in an initial signal receiving stage to obtain a cross-correlation result set; detecting a short training field signal according to the cross-correlation result set; when the short training field signal is detected, performing rough frequency offset estimation to obtain a rough frequency offset estimation value; performing rough frequency offset compensation according to the rough frequency offset estimation value; fixing the rough frequency offset estimation value, performing fine frequency offset estimation, and compensating residual frequency estimation; detecting a long training field signal to obtain a frame boundary; and performing channel estimation to obtain a final signal.

10 Claims, 6 Drawing Sheets

(56) References Cited

OTHER PUBLICATIONS

IEEE, "IEEE Standard for Local and metropolitan area networks—Part 15.4: Low-Rate Wireless Personal Area Networks (LR-WPANs) Amendment 3: Physical Layer (PHY) Specifications for Low-Data-Rate, Wireless, Smart Metering Utility Networks," in IEEE Std 802.15.4g-2012 (Amendment to IEEE Std 802.15.4-2011), Apr. 2012, pp. 1-252.

Tony J. Rouphael, "RF and Digital Signal Processing for Software-Defined Radio: A Multi-Standard Multi-Mode Approach," Elsevier, US, 2009, pp. 1-396.

Moose, Paul H., "A technique for orthogonal frequency division multiplexing frequency offset correction," in IEEE Transactions on Communications, vol. 42, No. 10, Oct. 1994, pp. 2908-2914.

Yahong Zhao et al., "A Synchronization Algorithm for Burst-Mode MR-OFDM System of 802.15.4g," Journal of Physics: Conference Series, vol. 1325, 2019 International Conference on Artificial Intelligence Technologies and Applications, Jul. 5-7, 2019, Qingdao, China, pp. 1-9.

Jorge Luis Gulfo Monsalve, "GreenOFDM a new method for OFDM PAPR reduction Application to the Internet of Things energy saving", PhD Thesis, University Grenoble Alpes, Oct. 2019, pp. 1-131.

Denise Costa Alves Tamagno, "OFDM Frame and Frequency Synchronization in IEEE 802.15.4g: Algorithms and Hardware Implementation," Master Thesis, University of Campinas, Jul. 2018, pp. 1-79.

Thinh Hung Pham et al., "Efficient Integer Frequency Offset Estimation Architecture for Enhanced OFDM Synchronization," in IEEE Transactions on Very Large Scale Integration (VLSI) Systems, vol. 24, No. 4, Apr. 2016, pp. 1-10.

Raween Kumar Nishad et al., "Carrier frequency offset estimation in OFDM systems," 2013 IEEE Conference on Information & Communication Technologies, Jul. 2013, pp. 885-889.

Abdulgani Ibrahim et al., "A Comparative Study of Carrier Frequency Offset (CFO) Estimation Techniques for OFDM Systems," IOSR Journal of Electronics and Communication Engineering, vol. 9, No. 4, Jul. 2014, pp. 1-7.

\* cited by examiner

| STF OFDM Symbol | STF OFDM Symbol | STF OFDM Symbol | STF OFDM Symbol |
|---|---|---|---|

Option 1
1/8 cycle: S S S S S S S S S S S S S S S S S S S S S S S S S S S S -S -S -S -S Option 2&3
1/4 cycle: S S S S S S S S S S S S S S -S -S Option 4
1/2 cycle: S S S S S S S -S

FIG. 3

ROBUST METHOD AND DEVICE FOR ESTIMATING FREQUENCY OFFSET IN ORTHOGONAL FREQUENCY DIVISION MULTIPLEXING COMMUNICATION

CROSS-REFERENCE TO RELATED APPLICATION

This application claims the priority benefit of China application serial no. 202111072870.6, filed on Sep. 14, 2021. The entirety of the above-mentioned patent application is hereby incorporated by reference herein and made a part of this specification.

BACKGROUND

1. Field of the Invention

The disclosure belongs to the field of wireless communication technologies, and more particularly, relates to a robust method and device for estimating frequency offset in orthogonal frequency division multiplexing communication.

2. Description of Related Art

Orthogonal Frequency Division Multiplexing (OFDM) modulation is a widely used communication solution. The basic idea of the OFDM modulation is to divide an available channel frequency band into several narrow sub-frequency bands, and modulate data into adjacent and orthogonal sub-carriers, thus improving a bandwidth efficiency of a system.

In order to process the delay spread of a wireless channel, a Cyclic Prefix (CP) is usually added in front of a symbol, and the CP corresponds to a copy of a last part of each orthogonal frequency division multiplexing symbol. In addition, a preamble and a pilot frequency may be added into an orthogonal frequency division multiplexing symbol frame to help a synchronization process in a receiver.

Generally, in a wireless communication system, a performance of the receiver may be degraded due to various time and frequency damages, such as crystal oscillator mismatch (mismatch between local crystal oscillators of a transmitter and the receiver, which is namely a crystal oscillation frequency difference), unknown propagation delay between the transmitter and the receiver, and an influence of Doppler frequency shift. These damages result in a synchronization error combination in a received signal, including Carrier Frequency Offset (CFO) and Symbol Timing Offset (STO), which is also known as a symbol boundary error. Due to the need for an orthogonality between the sub-carriers, the orthogonal frequency division multiplexing system is more sensitive to these errors than a traditional single-carrier communication system. In order to recover transmitted data correctly, a synchronization procedure in the orthogonal frequency division multiplexing receiver is necessary.

Since orthogonal frequency division multiplexing modulation is a widely used communication solution, many prior arts about synchronization have been disclosed in documents. However, from a point of view of hardware implementation or numerical operation, they are relatively complex.

REFERENCES

Reference 1, 802.15.4-2015—IEEE Standard for Low-Rate Wireless Networks, IEEE, 2015;

Reference 2, IEEE std. 802.15.4g-2012, Amendment 3: Physical Layer (PHY) Specifications for Low-Data-Rate, Wireless, Smart Metering Utility Networks, Apr. 27, 2012

Reference 3, Tony J. Rouphael, R F and Digital Signal Processing for Software-Defined Radio: A multi-standard multi-mode approach, Elsevier, 2009

Reference 4, Paul H. Moose, A Technique for Orthogonal Frequency Division Multiplexing Frequency Offset Correction, IEEE transactions on communications., 1994, 42(10), pp. 2908-2914.

Reference 5, Yahong Zhao, et. al., A Synchronization Algorithm for Burst-Mode MR-OFDM System of 802.15.4g, Journal of Physics: Conference Series, Volume 1325, 2019 International Conference on Artificial Intelligence Technologies and Applications 5-7 Jul. 2019, Qingdao, China Reference 6, Jorge Luis Gulfo Monsalve, Green OFDM a new method for OFDM PAPR reduction Application to the Internet of Things energy saving, Ph. D. thesis, 2016

Reference 7, Denise Costa Alves Tamagno, OFDM Frame and Frequency Synchronization in IEEE 802.15.4g: Algorithms and Hardware Implementation, Master thesis, Electrical and Computer Engineering of the University of Campinas, 2018

Reference 8, Thinh Hung Pham, Suhaib A. Fahmy, and Ian Vince McLoughlin, Efficient Integer Frequency Offset Estimation Architecture for Enhanced OFDM Synchronization, IEEE Transactions on Very Large Scale Integration (VLSI) Systems, Vol. 24, Issue: 4, April 2016, pp. 1412-1420

Reference 9, Praween Kumar Nishad and P. Singh, Carrier Frequency Offset Estimation in OFDM Systems, Proceedings of 2013 IEEE Conference on Information and Communication Technologies, 2013, pp. 885-888

Reference 10, Abdul Gani Abshir, et. al, A Comparative Study of Carrier Frequency Offset (CFO) Estimation Techniques for OFDM Systems, IOSR Journal of Electronics and Communication Engineering (IOSR-JECE), Volume 9, Issue 4, Ver. IV, 2014, pp. 01-06.

SUMMARY OF THE INVENTION

Object of the invention: the technical problem to be solved by the disclosure is to provide a robust method and device for estimating frequency offset in orthogonal frequency division multiplexing communication aiming at the defects in the prior art.

In order to solve the technical problem above, in a first aspect, a robust method for estimating frequency offset in orthogonal frequency division multiplexing communication is disclosed, which includes the following steps of: step 1: in an initial receiving stage of an orthogonal frequency division multiplexing signal, preprocessing a the received signal in $N_S$ symbol periods and a short training field signal respectively to obtain $N_S$ preprocessed frequency domain sequences and a preprocessed frequency domain short training field sequence; and performing cyclic shift cross-correlation on the $N_S$ preprocessed frequency domain sequences with the preprocessed frequency domain short training field sequence to obtain a cross-correlation result set: $\{\{R_m(i)\}_{i \in N_{AR}}, \ldots, \{R_l(i)\}_{i \in N_{AR}}, \ldots, \{R_{m+n_S-1}(i)\}_{i \in N_{AR}}\}$; wherein, $l$ represents an $l^{th}$ symbol period of the initial signal, $m \le l \le m+N_S-1$, $m$ represents the first symbol period to perform cyclic shift cross-correlation on the $N_S$ preprocessed frequency domain sequences with the preprocessed frequency domain short training field sequence and $N_S$ does not exceed a total number of symbols in the initial signal receiving stage; $\{R_l(i)\}_{i \in N_{AR}}$ represents a cross-correlation result sequence of the $l^{th}$ symbol period, and i represents a number of cyclic shifts; $N_{AR}$ represents a range of the number of the cyclic shifts, which is set according to a preset frequency offset acquisition range $F_{AR}$; and l does not exceed the total number of symbols in the initial signal receiving stage;

step 2: according to the cross-correlation result set, detecting a short training field signal; when the short training field signal is detected, performing rough frequency offset estimation to obtain a rough frequency offset estimation value; performing frequency offset compensation according to the rough frequency offset estimation value; and when the short training field signal is not detected, increasing a value of m by 1, and repeating the step 1;

step 3: fixing the rough frequency offset estimation value, performing fine frequency offset estimation to obtain a fine frequency offset estimation value, combining the fixed rough frequency offset estimation value with the fine frequency offset estimation value to obtain a combined frequency offset estimation value, and performing frequency offset compensation according to the combined frequency offset estimation value;

step 4: detecting a long training field signal to obtain a frame boundary; and step 5: performing channel estimation to complete an initialization process of orthogonal frequency division multiplexing signal reception.

In combination with the first aspect, in one implementation, in the step 1, a time domain sequence of the $l^{th}$ symbol period is recorded as $\{y_l(n)\}_{n=0}^{N-1}$, which is transformed into a corresponding frequency domain sequence $\{Y_l(k)\}_{k=0}^{N-1}$ through discrete Fourier transform, and N represents a number of samples of the time domain sequence of the $l^{th}$ symbol period; and the step 1 includes: performing cyclic shift cross-correlation on an absolute value of the frequency domain sequence of the $l^{th}$ symbol period with an absolute value of the frequency domain short training field sequence to obtain a cross-correlation result, as shown in the following formula:

$$R_l(i) = R_{Y_l, S_{STF}}(i) = \sum_{k=0}^{N-1} |Y_l(k)||S^*_{STF}((k-i)\%N)|$$

wherein, $\{S_{STF}(k)\}_{k=0}^{N-1}$ represents the frequency domain short training field sequence; $S_{STF}^*$ is a complex conjugate of $S_{STF}$; and % represents modular arithmetic.

In combination with the first aspect, in one implementation, in the step 1, a time domain sequence of the $l^{th}$ symbol period is recorded as $\{y_l(n)\}_{n=0}^{N-1}$, which is transformed into a corresponding frequency domain sequence $\{Y_l(k)\}_{k=0}^{N-1}$ through discrete Fourier transform, and N represents a number of samples of the time domain sequence of the $l^{th}$ symbol period; and the step 1 includes: performing cyclic shift cross-correlation on an absolute value of the frequency domain sequence of the $l^{th}$ symbol period with an absolute value of a low-complexity sequence corresponding to the frequency domain short training field sequence to obtain a cross-correlation result, as shown in the following formula:

$$R_l(i) = R_{Y_l, I}(i) = \sum_{k=0}^{N-1} |Y_l(k)| \cdot |I^*((k-i)\%N)|$$

wherein, $\{I(k)\}_{k=0}^{N-1}$ represents the low-complexity sequence corresponding to the frequency domain short training field sequence, I* is a complex conjugate of I, and % represents modular arithmetic; and I(j) is defined to be 1 at a $j^{th}$ sub-carrier index with a non-zero value in the frequency domain short training field sequence, otherwise I(j) is defined to be 0, as shown in the following formula:

$$I(j) = \begin{cases} 1, \text{ if } j = D \cdot i, \text{ and } i = 1, \ldots (N/D - 1) \\ 0, \text{ others} \end{cases}$$

N represents a number of sub-carriers, which is consistent with the number of samples in the time domain sequence of the $l^{th}$ symbol period; and D represents an interval between the sub-carriers at which the frequency domain short training field sequence that non-zero values are located.

In combination with the first aspect, in one implementation, in the step 1, a time domain sequence of the $l^{th}$ symbol period is recorded as $\{y_l(n)\}_{n=0}^{N-1}$, which is transformed into a corresponding frequency domain sequence $\{Y_l(k)\}_{k=0}^{N-1}$ through discrete Fourier transform, and N represents a number of samples of the time domain sequence of the $l^{th}$ symbol period; and the step 1 includes: performing cyclic shift cross-correlation on a square absolute value of the frequency domain sequence of the $l^{th}$ symbol period with an absolute value of the frequency domain short training field sequence to obtain a cross-correlation result, as shown in the following formula:

$$R_l(i) = R_{Y_l^2, S_{STF}}(i) = \sum_{k=0}^{N-1} |Y_l(k)|^2 |S^*_{STF}((k-i)\%N)|$$

wherein, $\{S_{STF}(k)\}_{k=0}^{N-1}$ represents the frequency domain sequence with short training field; $S_{STF}^*$ is a complex conjugate of $S_{STF}$; and % represents modular arithmetic.

In combination with the first aspect, in one implementation, in the step 1, a time domain sequence of the $l^{th}$ symbol period is recorded as $\{y_l(n)\}_{n=0}^{N-1}$, which is transformed into a corresponding frequency domain sequence $\{Y_l(k)\}_{k=0}^{N-1}$ through discrete Fourier transform, and N represents a number of samples of the time domain sequence of the $l^{th}$ symbol period; and the step 1 includes: performing cyclic shift cross-correlation on a square absolute value of the frequency domain sequence of the $l^{th}$ symbol period with an absolute value of a low-complexity sequence corresponding to the frequency domain short training field sequence to obtain a cross-correlation result, as shown in the following formula:

$$R_l(i) = R_{Y_l^2, I}(i) = \sum_{k=0}^{N-1} |Y_l(k)|^2 |I^*((k-i)\%N)|$$

wherein, $\{I(k)\}_{k=0}^{N-1}$ represents the low-complexity sequence corresponding to the frequency domain short training field sequence, I* is a complex conjugate of I, and % represents modular arithmetic; and I(j) is defined to be 1 at a $j^{th}$ sub-carrier index with a non-zero value in the frequency domain short training field sequence, otherwise I(j) is defined to be 0, as shown in the following formula;

$$I(j) = \begin{cases} 1, & \text{if } j = D \cdot i, \text{ and } i = 1, \ldots (N/D - 1) \\ 0, & \text{others} \end{cases}$$

D represents an interval between the sub-carriers at which the frequency domain short training field sequence that non-zero values are located.

In combination with the first aspect, in one implementation, in the step 2, when $N_S=1$, a sequence $\{R_m(i)\}_{i \in N_{AR}}$ exists in the cross-correlation result set, if a peak value of the sequence $\{R_m(i)\}_{i \in N_{AR}}$ is greater than a first threshold value $T_1$, then a detection result of the short training field signal is indicated to be 1, and it is determined that an expected short training field signal is detected, as shown in the following formula:

$$\text{detection result of short training field signal} = \begin{cases} 1, & \max_{i \in N_{AR}} R_m(i) \geq T_1 \\ 0, & \text{others} \end{cases}$$

the first threshold value $T_1$ is adaptively adjusted according to a frequency domain sequence $\{Y_m(k)\}_{k=0}^{N-1}$ of the $m^{th}$ symbol period; and a location of the peak value of the sequence $\{R_m(i)\}_{i \in N_{AR}}$ is shown in the following formula:

$$\hat{f}_{int} = \arg\max_{i \in N_{AR}} R_m(i)$$

the rough frequency offset estimation value is $\hat{f}_{int} \cdot \Delta f$, and $\Delta f$ represents the frequency interval between two adjacent sub-carriers of the frequency domain short training field sequence.

In combination with the first aspect, in one implementation, in the step 2, when $N_S > 1$, $N_S$ sequences $\{R_l(i)\}_{i \in N_{AR}}$ exist in the cross-correlation result set, and a peak value $$\max_{i \in N_{AR}} R_l(i)$$

of each sequence is sequentially compared with a first threshold value $T_{l,1}$ of a corresponding symbol period, and when the peak value $$\max_{i \in N_{AR}} R_l(i)$$

is greater than the first threshold value $T_{l,1}$ for the first time, then it is determined that an expected short training field signal is detected; the first threshold value $T_{l,1}$ is adaptively adjusted according to a frequency domain sequence $\{Y_l(k)\}_{k=0}^{N-1}$ of the $l^{th}$ symbol period; and a location of the peak value at which the peak value $$\max_{i \in N_{AR}} R_l(i)$$

is greater than the first threshold value $T_{l,1}$ each time is recorded:

$$\hat{f}_{l,int} = \arg\max_{i \in N_{AR}} R_l(i)$$

locations of all recorded peak values are averaged to obtain $\hat{f}_{int}$, the rough frequency offset estimation value is $\hat{f}_{int} \cdot \Delta f$, and $\Delta f$ represents the frequency interval between two adjacent sub-carriers of the frequency domain short training field sequence. Averaging the locations of all recorded peak values can improve a quality of the rough frequency offset estimation value.

In combination with the first aspect, in one implementation, in the step 2, cross-correlation results of the $i^{th}$ element corresponding to $N_S$ sequences $\{R_l(i)\}_{i \in N_{AR}}$ in the cross-correlation result set are averaged to obtain an average cross-correlation result sequence $\{R_{m,N_S}(i)\}_{i \in N_{AR}}$ as shown in the following formula;

$$R_{m,N_S}(i) = \frac{\sum_{l=m}^{m+N_S-1} R_l(i)}{N_S}$$

if a peak value of the sequence $\{R_{m,N_S}(i)\}_{i \in N_{AR}}$ is greater than a first threshold value $T_1$, then a detection result of the short training field signal is indicated to be 1, and it is determined that an expected short training field signal is detected, as shown in the following formula:

$$\text{detection result of short training field signal} = \begin{cases} 1, & \max_{i \in N_{AR}} R_{m,N_S}(i) \geq T_1 \\ 0, & \text{others} \end{cases}$$

the first threshold value $T_1$ is adaptively adjusted according to a frequency domain sequence $\{Y_l(k)\}_{k=0}^{N-1}$ of the $N_S$ symbol periods;

performing short training field signal detection on the average cross-correlation result sequence can improve a reliability of the short training field signal detection;

a location of the peak value of the sequence $\{R_{m,N_S}(i)\}_{i \in N_{AR}}$ is shown in the following formula:

$$\hat{f}_{int} = \arg\max_{i \in N_{AR}} R_{m,N_S}(i)$$

the rough frequency offset estimation value is $\hat{f}_{int} \cdot \Delta f$, and $\Delta f$ represents the frequency interval between two adjacent sub-carriers of the frequency domain short training field sequence.

In combination with the first aspect, in one implementation, a time domain sequence of the $l^{th}$ symbol period is recorded as $\{y_l(n)\}_{n=0}^{N-1}$, which is transformed into a corresponding frequency domain sequence $\{Y_l(k)\}_{k=0}^{N-1}$ through discrete Fourier transform, and N represents a number of samples of the time domain sequence of the $l^{th}$ symbol period; and the step 4 includes: multiplying the complex frequency domain sequence of the $l^{th}$ symbol period with a complex conjugate of a frequency domain long training field sequence, as shown in the following formula:

$$R_{Y_l,S_{LTF}}(k) = Y_l(k) S_{LTF}^*(k), k=0,1,\ldots,N-1$$

wherein, $\{S_{LTF}(k)\}_{k=0}^{N-1}$ is the frequency domain long training field sequence, and $S_{LTF}^*$ is a complex conjugate of $S_{LTF}$; and performing an inverse discrete Fourier transform operation on a result $\{R_{Y_l,S_{LTF}}(k)\}_{k=0}^{N-1}$ of the multiply operation above to obtain a corresponding time domain sequence, as shown in the following formula:

$$\hat{r}_l(n) = \frac{1}{\sqrt{N}} \sum_{k=0}^{N-1} R_{Y_l,S_{LTF}}(k) e^{\frac{j2\pi kn}{N}}, n = 0, 1, ..., N-1$$

if a peak value of the sequence $\{|\hat{r}_l(n)|\}_{n=0}^{N-1}$ is greater than a second threshold value $T_{LTF}$, then a detection result of the long training field signal is indicated to be 1, and it is determined that an expected long training field signal is detected, as shown in the following formula;

detection result of long training field signal =

$$\begin{cases} 1, \max_{n \in \{0,1,...,N-1\}} |\hat{r}_l(n)| > T_{LTF} \\ 0, \text{others} \end{cases}$$

the second threshold value $T_{LTF}$ is adaptively adjusted according to a frequency domain sequence $\{Y_l(k)\}_{k=0}^{N-1}$ of the $l^{th}$ symbol period; and a location of the peak value of the sequence $\{|\hat{r}_l(n)|\}_{n=0}^{N-1}$ is a long training field symbol boundary, as shown in the following formula:

$$\text{long training field symbol boundary} = \arg\max_{n \in \{0,1,...,N-1\}} |\hat{r}_l(n)|.$$

In a second aspect, a robust device for estimating frequency offset in orthogonal frequency division multiplexing communication is disclosed, which includes an analog-digital converter, a cascaded integrator-comb filter, a digital-down converter, a decimation filter, a first FFT processing module, a STF detecting module, a rough frequency offset estimation module, a fine frequency offset estimation module, a LTF detecting module, a channel estimation module, a CP removing module, a second FFT processing module and a demodulating and decoding module, wherein the analog-to-digital converter is configured for receiving an OFDM signal and converting the same into a digital signal;

the cascaded integrator-comb filter is configured for filtering and decimating the digital signal to obtain a first decimated signal;

the digital down-converter is configured for converting the first decimated signal into a baseband orthogonal frequency division multiplexing signal by combining frequency offset estimation values sent by the rough frequency offset estimation module and the fine frequency offset estimation module;

the decimation filter is configured for filtering and decimating the baseband orthogonal frequency division multiplexing signal to obtain a second decimated signal;

the first FFT processing module is configured for converting the second decimated signal into a frequency domain sequence; preprocessing the frequency domain sequence and a frequency domain short training field sequence, respectively, and performing cyclic shift cross-correlation on the preprocessed sequences to obtain a cross-correlation result set;

the SFT detecting module is configured for detecting a short training field signal according to the cross-correlation result set;

the rough frequency offset estimation module is configured for, when a short training field signal is detected, performing rough frequency offset estimation to obtain a rough frequency offset estimation value; sending the rough frequency offset estimation value to the digital-down converter for frequency offset compensation; and fixing a rough frequency offset estimation value after frequency offset compensation;

the fine frequency offset estimation module is configured for, after performing frequency offset compensation on the rough frequency offset estimation value, performing fine frequency offset estimation to obtain a fine frequency offset estimation value; combining the fixed rough frequency offset estimation value with the fine frequency offset estimation value to obtain a combined frequency offset estimation value; and sending the combined frequency offset estimation value to the digital down-converter for frequency offset compensation;

the LTF detecting module is configured for, after the short training field signal is detected, detecting a long training field signal to obtain a frame boundary;

the channel estimation module is configured for, after the frame boundary is obtained, performing channel estimation to obtain a channel impulse response;

the CP removing module is configured for removing CP from the second decimated signal according to the frame boundary to obtain a first processed signal;

the second FFT processing module is configured for performing FFT transformation on the first processed signal to obtain a frequency domain signal of the first processed signal; and the demodulating and decoding module is configured for, according to the channel impulse response, demodulating and decoding the frequency domain signal of the first processed signal to obtain a final signal.

Beneficial effects: the robust method for estimating frequency offset in orthogonal frequency division multiplexing communication provided by the disclosure includes a simple signal detection mechanism and a robust and low-complexity rough frequency offset estimation mechanism, which perform well in an environment from an extremely low-level signal-to-noise ratio to a high-level signal-to-noise ratio. In this kind of receiver or a similar receiver, these methods provide an initial but important step, which can implement accurate estimation and adaptive compensation even if a carrier frequency in a received signal has considerable offset, thus having a fairly good robust characteristic. When being applied to a smart metering utility network, the method can effectively reduce a hardware implementation cost and an operation and maintenance cost.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

FIG. 3 is a schematic structural diagram of a short training field in a smart metering utility network—orthogonal frequency division multiplexing.

DESCRIPTION OF THE EMBODIMENTS

The embodiments of the disclosure are described hereinafter with reference to the accompanying drawings.

For orthogonal frequency division multiplexing modulation, coded data is usually mapped to symbols through a mapping solution, such as Phase Shift Keying (PSK) or Quadrature Amplitude Modulation (QAM), and these mapped symbols are grouped and distributed on a limited number of sub-carriers to establish an orthogonal frequency division multiplexing symbol. In an orthogonal frequency division multiplexing transmitter, each orthogonal frequency division multiplexing symbol is transformed from frequency domain to time domain by Inverse Discrete Fourier-transform (IDFT).

Mathematically, when a sequence of N frequency domain samples $\{Y(k)\}_{k=0}^{N-1}$ are given, a corresponding sequence of time domain samples $\{y(n)\}_{n=0}^{N-1}$ may be calculated from $\{Y(k)\}_{k=0}^{N-1}$ by using inverse discrete Fourier transform, as shown in formula 1; wherein k values with indexes from 0 to (N/2)−1 correspond to sub-carriers in frequency domain numbers from 0 to (N/2)−1, and k values with indexes from (N/2) to (N−1) correspond to sub-carriers in frequency domain numbers from −(N/2) to −1 respectively.

$$y(n) = \frac{1}{\sqrt{N}} \sum_{k=0}^{N-1} Y(k) e^{j2\pi nk/N}, n = 0, \ldots, N-1 \quad (1)$$

On the contrary, when a sequence of N time domain samples $\{y(n)\}_{n=0}^{N-1}$ are given, the N samples may be recovered into $\{Y(k)\}_{k=0}^{N-1}$ after Discrete Fourier Transform (DFT), as shown in formula 2.

$$Y(k) = \frac{1}{\sqrt{N}} \sum_{k=0}^{N-1} y(n) e^{-\frac{j2\pi kn}{N}}, k = 0, \ldots, N-1 \quad (2)$$

Figure 1:
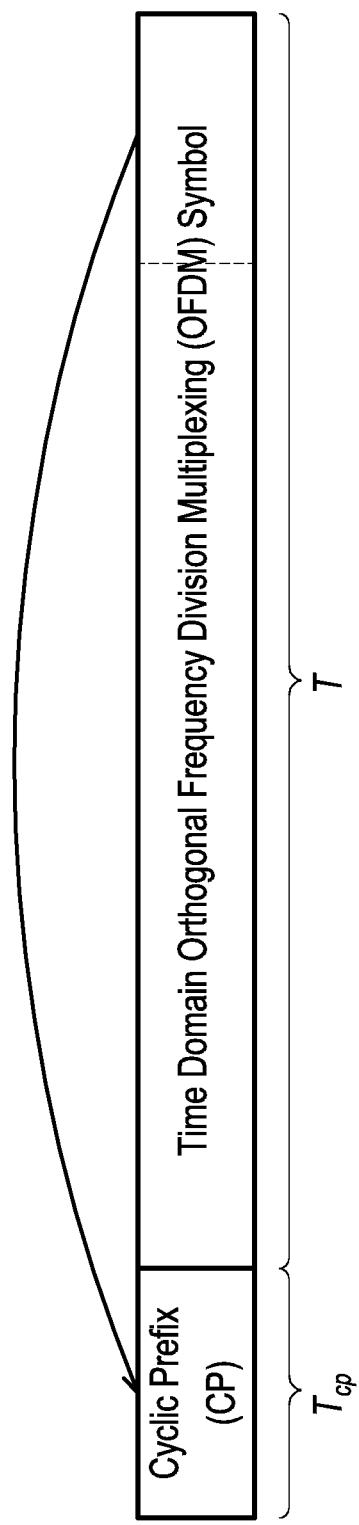
FIG. 1 is a schematic structural diagram of a cyclic prefix and an orthogonal frequency division multiplexing symbol.
Figure 2:
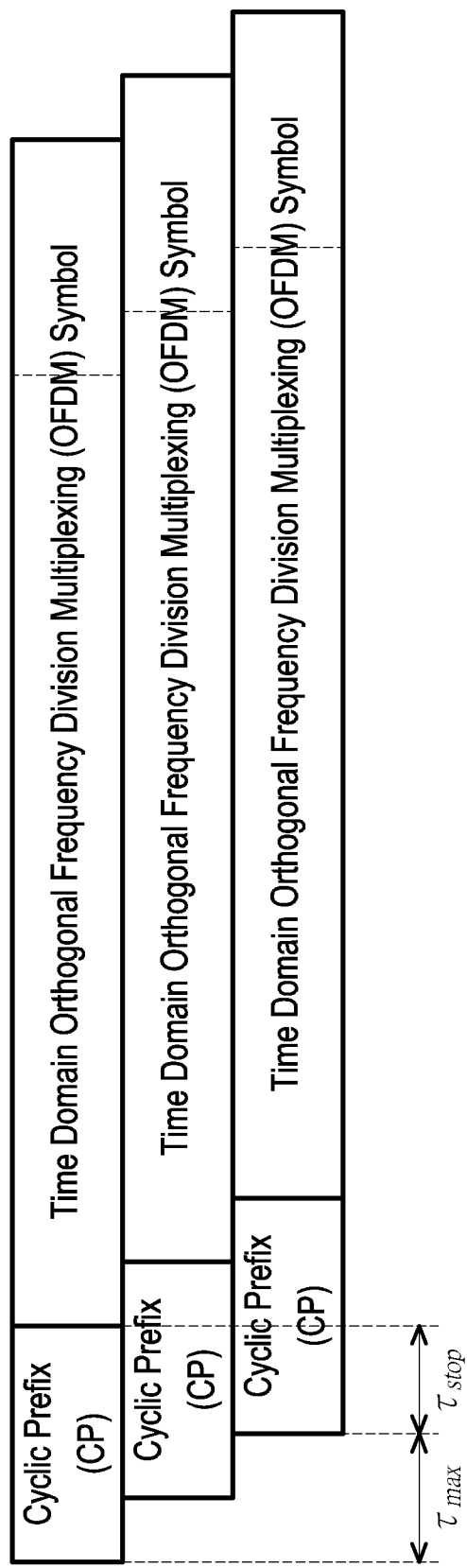
FIG. 2 is a schematic diagram of orthogonal frequency division multiplexing symbols overlapping in a multi-path channel.

In order to process delay spread of a wireless channel, a cyclic prefix is usually added in front of each orthogonal frequency division multiplexing symbol in advance, and the cyclic prefix is copied from a last part of the orthogonal frequency division multiplexing symbol, as shown in FIG. 1 and FIG. 2. In addition, a preamble and a pilot frequency may be added into an orthogonal frequency division multiplexing symbol frame to help a synchronization process in a receiver.

The purpose of the cyclic prefix is to compete with Inter-Symbol Interference (ISI) and Intra-Symbol Interference. The cyclic prefix is guard time composed of copies of time domain orthogonal frequency division multiplexing symbol waveforms. A basic method is to copy a back part of the orthogonal frequency division multiplexing signal to a front part to create a guard period, as shown in FIG. 1.

Duration $T_{cp}$ of the cyclic prefix is selected to be longer than a maximum delay spread $\tau_{max}$ caused by a multi-path channel. Meanwhile, a starting point of sampling the orthogonal frequency division multiplexing symbol at a receiving end must be somewhere in an interval ($\tau_{max}$, $T_{cp}$), as shown in FIG. 2. According to an IEEE802.15.4/4g standard, a length of the cyclic prefix adopted is ¼ of a length of time domain of the orthogonal frequency division multiplexing symbol. Details refer to References 1 to 2.

Generally, in a wireless communication system, a performance of the receiver may be degraded due to various time and frequency damages, such as mismatch between local crystal oscillators of a transmitter and the receiver, unknown propagation delay between the transmitter and the receiver, and an influence of Doppler frequency shift. These damages result in a synchronization error in a received signal, including Carrier Frequency Offset (CFO) and Symbol Timing Offset (STO), which is also known as a symbol boundary error. Due to the need for an orthogonality between the sub-carriers, the orthogonal frequency division multiplexing communication system is more sensitive to these errors than a traditional single-carrier communication system. However, due to some advantages of orthogonal frequency division multiplexing, such as a reduced complexity of channel equalization, an orthogonal frequency division multiplexing modulation technology is still a good solution for high data rate applications, and has been adopted by many standards, such as IEEE 802.11 (for a wireless local area network), IEEE 802.16d (for a metropolitan area network) and IEEE802.15.4 (References 1 to 2).

There are three main reasons for symbol timing offset: firstly, random initialization of the orthogonal frequency division multiplexing receiver, which makes the orthogonal frequency division multiplexing symbol offset from an ideal location at a sampling time point in the receiver; secondly, an orthogonal frequency division multiplexing symbol boundary estimation error caused by an algorithm problem or impulse response expansion resulted from the multi-path channel; and finally and thirdly, drifting of an ideal sampling point caused by a clock error resulted from crystal oscillator frequency offset. A direct consequence of the symbol timing offset is the symbol boundary error, so that a part of the previous symbol and a part of the next symbol are regarded as belonging to the current symbol and demodulated. In this case, the Inter-Symbol Interference (ISI) may occur. Details refer to Reference 9.

Carrier frequency offset is caused by Doppler frequency shift resulted from motion and mismatch between crystal oscillators of the transmitter and the receiver (which is namely a crystal oscillator frequency difference). The carrier frequency offset is usually normalized into a sub-carrier interval and divided into two parts: Fractional Carrier Frequency Offset (FCFO) $f_{frc}$, which corresponds to frequency offset smaller than the sub-carrier interval $\Delta f$ in a signal spectrum; and Integer Carrier Frequency Offset (ICFO) $f_{int}$, which corresponds to frequency offset that is an integer multiple of the sub-carrier interval. Fractional carrier frequency offset can reduce a signal amplitude and introduce an Inter-Carrier Interference (ICI), while integer carrier frequency offset may lead to cyclic shift of a sub-carrier index. Details refer to Reference 7.

Synchronization of the orthogonal frequency division multiplexing system, including frequency synchronization and symbol timing synchronization, has been widely studied and discussed in documents, such as References 4 to 10. Generally speaking, for system synchronization, a burst transmission mode has a higher requirement than a continuous transmission mode. In order to recover transmitted data correctly, a receiving end of the orthogonal frequency division multiplexing communication system must implement special signal processing, which generally depends on a transmitting end to add additional data, such as a cyclic prefix, a sparse pilot frequency, a preamble signal, etc. The additional data added by the transmitting end may be composed of one or more orthogonal frequency division multiplexing symbols. Some works in the documents discuss a problem about orthogonal frequency division multiplexing synchronization and put forward a solution. Some of the works try to put forward a complete solution for system synchronization (including frequency synchronization and timing synchronization), while some other works focus on solving specific problems, such as detection and compensation of carrier frequency offset, or focus on correction of a symbol timing error.

If frequency acquisition and symbol timing acquisition in an initial stage of signal reception both need to achieve timing and frequency synchronization accuracies required by the receiver in a wide range of Signal-Noise Ratio (SNR), such as being lower than 0 dB level or higher than extremely high dB level, then time periods of a preamble and a training symbol should be longer, for example, several orthogonal frequency division multiplexing preamble symbols for training are adopted in a specification about Smart Metering Utility Network (SUN)-Orthogonal Frequency Division Multiplexing in the IEEE 802.15.4/4g standard. Details refer to References 1 to 2. In addition, in order to make the orthogonal frequency division multiplexing preamble symbols have a robust performance to initial synchronization of large frequency offset between the transmitter and the receiver, a specially designed preamble has several repeated data parts with a specific length in each complete orthogonal frequency division multiplexing symbol.

A burst mode orthogonal frequency division multiplexing signal of Smart Metering Utility Network-Orthogonal Frequency Division Multiplexing (SUN-OFDM) defined in the IEEE802.15.4/4g standard is composed of a Synchronization Header (SHR), a Physical Header (PHR) and a Packet Service Data Unit (PSDU), as shown in Table 1, wherein the synchronization header is composed of a Short Training Field (STF) symbol and a Long Training Field (LTF) symbol, and used for acquisition of a preamble of a data packet, rough and fine frequency synchronization, symbol timing synchronization, and channel estimation.

TABLE 1

Frame structure of physical layer protocol data unit of smart metering utility network - orthogonal frequency division multiplexing

| Synchronization Header (SHR) | | Physical Header (PHR) | Packet Service Data Unit (PSDU) |
|---|---|---|---|
| Short Training Field (STF) symbol | Long Training Field (LTF) symbol | | PHY payload |

The short training field is a first field of the PHY Protocol Data Unit (PPDU), as shown in Table 1, and used for detecting the start of the frame. In the IEEE 802.15.4/4g standard, the short training field is described by four tables. Details refer to References 1 to 2. These tables set frequency domain configuration of all operation modes, which means that each table determines which sub-carriers must be activated in corresponding operation modes during transmission of the orthogonal frequency division multiplexing symbol of the short training field, so as to be in a non-zero active state. For options 1 and 2, 12 sub-carriers have non-zero contribution, while for options 3 and 4, there are 6 active sub-carriers.

Accordingly, time domain symbols with short training field of different options −o (o=1, 2, 3, 4) are generated as follows.

STF time(option−$o$)=inverse discrete Fourier transform(STF_freq(option−$o$))

That is, a time domain signal of the short training field is generated from a Binary Phase Shift Keying (BPSK) signal in frequency domain with short training field by inverse discrete Fourier transform, and then the cyclic prefix is added in front of the orthogonal frequency division multiplexing symbol.

In addition, according to the IEEE802.15.4/4g standard, there are four orthogonal frequency division multiplexing symbols in the Short Training Field (STF) part, and the last ½ of the fourth orthogonal frequency division multiplexing symbol is reversed in the time domain. For all options, a time length of the cyclic prefix is ¼ of the orthogonal frequency division multiplexing symbol. Details refer to References 1 to 2.

It should be noted that in the option 1, an interval for configuring non-zero binary phase shift keying signals in frequency domain for symbols in the short training field covers 8 sub-carriers. Therefore, the time domain signal of the short training field satisfies formula 3 and formula 4.

$$x(n-q)=x(n-q-N\_D)=x(n-q-2N\_D)= \ldots =x(n-q-35N\_D), q=0,1,\ldots,N\_D-1 \quad (3)$$

$$x(n-q)=-x(n+q)=-x(n+q+N\_D)=-x(n+q+2N\_D)=x(n+q+3N\_D), q=0,1,\ldots,N\_D-1 \quad (4)$$

wherein n is the sample index in a last non-inverted repeated data of the short training field, $N_D$=N/8, and N is a size of the discrete Fourier transform.

A structure of the short training field in other options 2 to 4 also has similar repeated data, as shown in FIG. 3. Each S in FIG. 3 represents corresponding repeated data with different lengths of time domain in the options 1, 2, 3 and 4 of the Smart Metering Utility Network-Orthogonal Frequency Division Multiplexing (SUN-OFDM).

More specifically, N is allowed to represent a number of sub-carriers, $N_{CP}$ represents a length of the cyclic prefix, which is namely a number of samples, and D represents an interval between adjacent non-zero training sub-carriers of the orthogonal frequency division multiplexing symbol of the short training field in the frequency domain, then parameters in the options 1 to 4 are set as follows:

Option 1: N=128; $N_{CP}$=32; D=8;
Option 2: N=64; $N_{CP}$=16; D=4;
Option 3: N=32; $N_{CP}$=8; D=4;
Option 4: N=16; $N_{CP}$=4; D=2.

Therefore, in the option 1, there are 36 sets of repeated data in the short training field, followed by the last ½ of the fourth orthogonal frequency division multiplexing symbol (containing 4 sets of repeated data), which is reversed in time domain, while for the options 2 and 3, there are 18 sets of repeated data in the short training field, followed by the last short-byte ½ of the fourth orthogonal frequency division multiplexing symbol (containing 2 sets of repeated data), which is reversed in time domain. For the option 4, there are 9 sets of repeated data in the short training field, followed by the last ½ of the fourth orthogonal frequency division multiplexing symbol (containing 1 set of repeated data), which is reversed in time domain.

As shown in Table 1, the long training field is a second field of the physical layer protocol data unit, and may be used for estimating integer carrier frequency offset and channel response in the receiver in the prior art. In this standard, the long training field is described by four tables. Details refer to References 1 to 2. In these tables, frequency domain configurations of all operation modes are set, just as the similar way in the short training field. However, different the short training field, except for a DC tone and guard tones, almost all sub-carriers are in an activated state, which means that the sub-carriers are in a non-zero active state. For options 1 to 4, numbers of active sub-carriers are 104, 52, 26 and 14, respectively.

Accordingly, time domain symbols with long training field of different options −o (o=1, 2, 3, 4) are generated as follows.

Time domain (option −o) of long training field=inverse discrete Fourier transform (frequency domain (option −o)).

Figure 4:
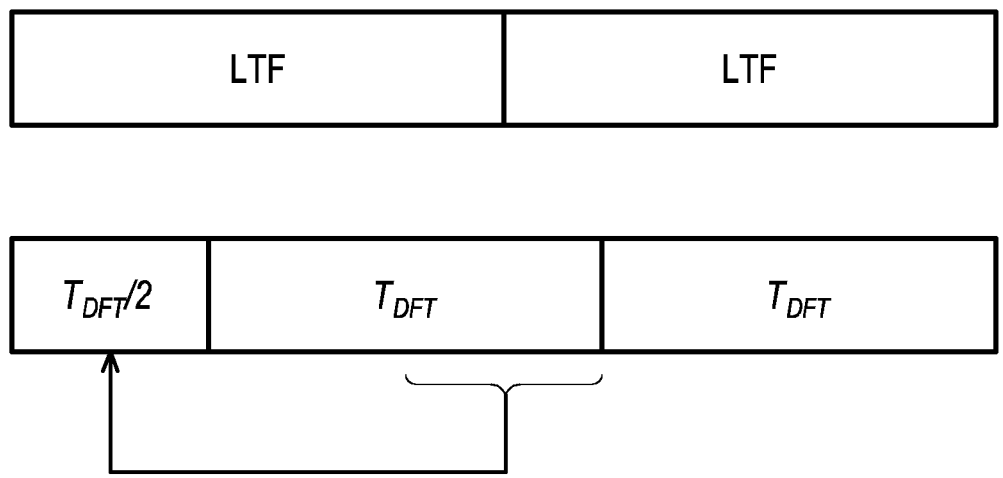
FIG. 4 is a schematic structural diagram of a long training field in a smart metering utility network—orthogonal frequency division multiplexing.

Moreover, a cyclic prefix of ½ symbol length is added to a front end of two consecutive basic symbols, as shown in FIG. 4, wherein $T_{DFT}$ is a time period of the basic symbols. Therefore, the long training field is composed of 2.5 repeated signal parts: one cyclic prefix of ½ symbol length and two basic symbols. Similar generation of the short training field signal, a time domain signal of the long training field is generated by inverse discrete Fourier transform according to configuration of binary phase shift keying (BPSK) parameters in frequency domain with long training field. More details refer to References 1 to 2.

In communication applications, frame structures of physical layer data units containing Short and Long Training Time Domain Symbol Sequences (STF and LTF) are packaged, and transmitted on a channel with frequency offset and destroyed by Gaussian noise. If a wireless channel is modeled into a discrete quasi-static Rayleigh attenuating Finite Impulse Response (FIR), maximum delay corresponds to a maximum number L of channel taps, and the received signal destroyed by white complex Gaussian noise w(n) to N(0, $\sigma^2$) may be expressed as formula 5.

$$y(n) = \frac{e^{j2\pi f_{err}(n-\tau)/N+\theta_0}}{\sqrt{N}} \sum_{q=0}^{L-1} h(q)x(n-\tau-q) + w(n) \quad (5)$$

$\{h(q)\}_{q=0}^{L-1}$ represents a channel model in a finite impulse response discrete form with L taps.

$f_{err}$ represents relative frequency offset between the transmitter and the receiver, which means that actual frequency offset is normalized into the sub-carrier frequency interval $\Delta f$.

$\tau$ represents signal propagation delay and timing offset caused by symbol time offset between the transmitter and the receiver.

$\theta_0$ represents an initial phase of the received signal.

The normalized Carrier Frequency Offset (CFO) may be divided into two components, as shown in formula 6.

$$f_{err} = f_{int} + f_{frc} \quad (6)$$

$f_{int}$ represents an integer frequency offset part, and $f_{frc}$ represents a fractional frequency offset part.

After receiving N continuous signal time domain samples $\{y(n)\}_{n=0}^{N-1}$, corresponding signal frequency domain samples may be calculated by discrete Fourier transform, as shown in formula 2.

A time period of the orthogonal frequency division multiplexing symbol is considered, as shown in formula 7.

$$Y_l(k) = \frac{1}{\sqrt{N}} \sum_{n=0}^{N-1} y_l(n) e^{-\frac{j2\pi kn}{N}}, k = 0, 1, ..., N-1 \quad (7)$$

N represents a period of the orthogonal frequency division multiplexing symbol and a size of fast Fourier transform, and l represents an $l^{th}$ symbol period.

An $n^{th}$ received signal sample in the $l^{th}$ symbol period is shown in formula 8.

$$y_l(n) = \frac{e^{j2\pi f_{err}(n-\tau)/N+\theta_0}}{\sqrt{N}} \sum_{q=0}^{L-1} h(q)x_l(n-\tau-q) + w_l(n) \quad (8)$$

In order to recover transmitted data correctly, the orthogonal frequency division multiplexing receiver must implement special signal processing. The embodiment of the present application provides the robust method and device for estimating frequency offset in orthogonal frequency division multiplexing communication. The method may be applied to a burst packet transmission mode or a similar communication system conforming to the Smart Metering Utility Network-Orthogonal Frequency Division Multiplexing (SUN-OFDM), and performs well in an environment from an extremely low-level signal-to-noise ratio to a high-level signal-to-noise ratio. In this kind of receiver or a similar receiver, the method provides an initial but important step to help achieve fast and robust frequency synchronization.

Figure 6:
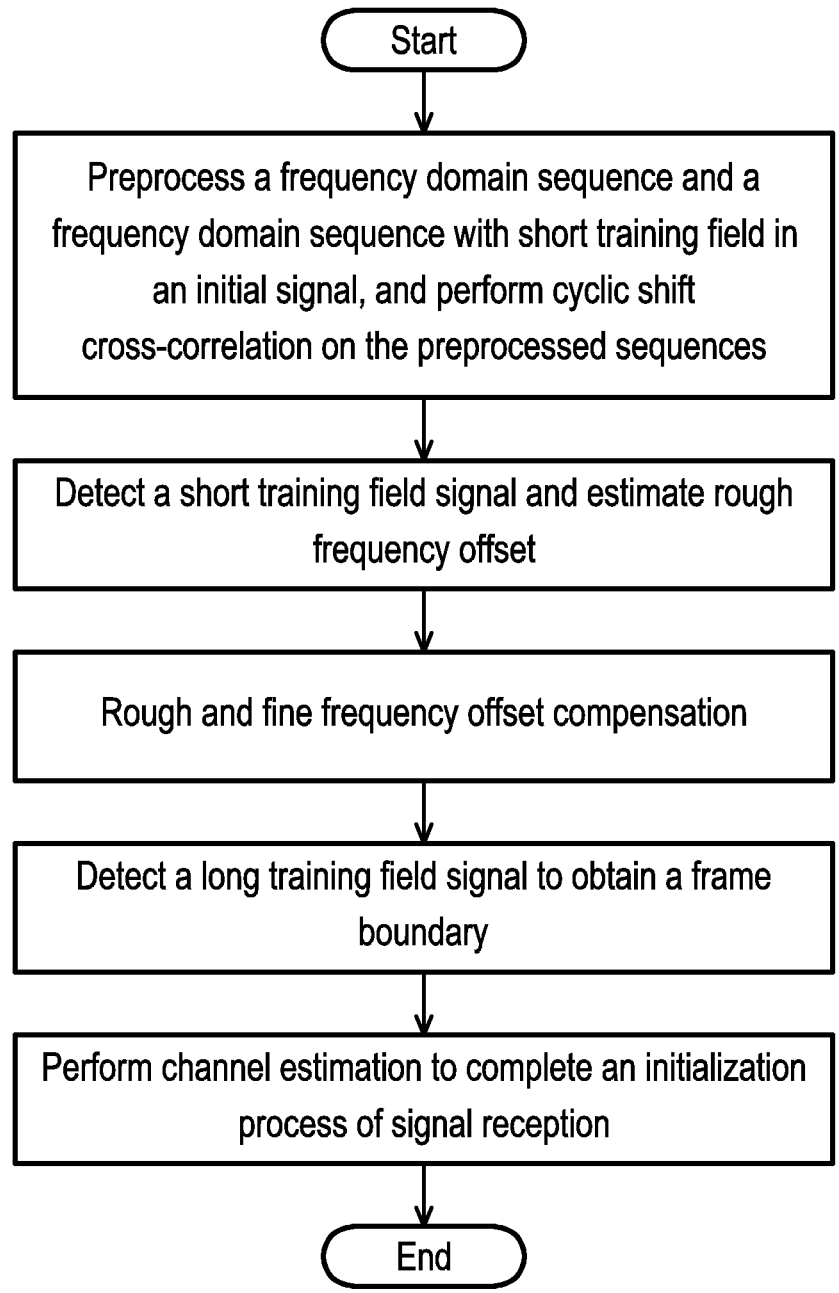
FIG. 6 is a flow chart of a robust method for estimating frequency offset in orthogonal frequency division multiplexing communication provided by an embodiment of the present application.

As shown in FIG. 6, the first embodiment of the disclosure discloses the robust method for estimating frequency offset in orthogonal frequency division multiplexing communication, which includes the following steps. In step 1, in an initial receiving stage of an orthogonal frequency division multiplexing signal, the received signal with $N_S$ symbol periods and a short training field signal are respectively preprocessed to obtain $N_S$ preprocessed frequency domain sequences and a preprocessed frequency domain short training field sequence; and cyclic shift cross-correlation is performed on the $N_S$ preprocessed frequency domain sequences with the preprocessed frequency domain short training field sequence respectively to obtain a cross-correlation result set: $\{\{R_m(i)\}_{i \in N_{AR}}, \ldots, \{R_l(i)\}_{i \in N_{AR}}, \ldots, \{R_{m+N_S-1}(i)\}_{i \in N_{AR}}\}$.

l represents an $l^{th}$ symbol period, $m \leq l \leq m+N_S-1$, m represents the first symbol period to perform cyclic shift cross-correlation on the preprocessed frequency domain sequences with the frequency domain short training field sequence, and $N_S$ does not exceed a total number of symbols in the initial signal receiving stage; $\{R_l(i)\}_{i \in N_{AR}}$ represents a cross-correlation result sequence of the $l^{th}$ symbol period, l does not exceed the total number of symbols in the initial signal receiving stage, and i represents a number of cyclic shifts; and $N_{AR}$ represents a range of the cyclic shifts, which is set according to a preset frequency offset acquisition range $F_{AR}$. In IEEE802.15.4/4g of the Smart Metering Utility Network-Orthogonal Frequency Division Multiplexing (SUN-OFDM), according to an interval D between non-zero training sub-carriers of the orthogonal frequency division multiplexing symbol of the short training field in frequency domain, upper and lower limits of the frequency offset acquisition range $F_{AR}$ may be set to be (D/2) and −(D/2) respectively. Taking the option 1 as an example, the frequency offset acquisition range $F_{AR}$ may be defined to be $$F_{AR} \triangleq \{-4, -3, ..., 4\},$$

with a corresponding maximum actual frequency acquisition or search range of [−4Δf, 4Δf], wherein Δf is a frequency interval between adjacent sub-carriers. If necessary, $F_{AR}$ may be limited to a smaller range to reduce frequency search time and a number of numerical operations. In the frequency domain sequence $\{Y_l(k)\}_{k=0}^{N-1}$ of the $l^{th}$ symbol period, k values with indexes from 0 to (N/2)−1 correspond to sub-carriers with frequency domain numbers from 0 to (N/2)−1, and k values with indexes from (N/2) to (N−1) correspond to sub-carriers with frequency domain numbers from −(N/2) to −1 respectively, then $N_{AR}$ corresponding to the option 1 is set to be {0,1,2,3,4,124,125,126,127}. Other options are set in a similar way.

In step 2, according to the cross-correlation result set, a short training field signal is detected; when the short training field signal is detected, rough frequency offset estimation is performed to obtain a rough frequency offset estimation value; frequency offset compensation is performed according to the rough frequency offset estimation value; and when the short training field signal is not detected, a value of m is increased by 1, and the step 1 is repeated.

In step 3, the rough frequency offset estimation value is fixed, fine frequency offset estimation is performed to obtain a fine frequency offset estimation value, the fixed rough frequency offset estimation value is combined with the fine frequency offset estimation value to obtain a combined frequency offset estimation value, and frequency offset compensation is performed according to the combined frequency offset estimation value.

In step 4, a long training field signal is detected to obtain a frame boundary.

In step 5, channel estimation is performed to complete an initialization process of orthogonal frequency division multiplexing signal reception.

In the embodiment, in an initial signal receiving stage before any frequency offset compensation and before correct alignment of the symbol boundary, a received $l^{th}$ signal sequence segment of N samples is marked as $\{y_l(n)\}_{n=0}^{N-1}$, and transformed into a corresponding frequency domain sequence $\{Y_l(k)\}_{k=0}^{N-1}$ by discrete Fourier transform as shown in formula 7.

The step 1 may be implemented in the following ways, including but being not limited to: in a first implementation, performing cyclic shift cross-correlation on an absolute value of the frequency domain sequence of the $l^{th}$ symbol period with an absolute value of the frequency domain short training field sequence to obtain a cross-correlation result, as shown in formula 9.

$$R_l(i) = R_{Y_l, S_{STF}}(i) = \sum_{k=0}^{N-1} |Y_l(k)||S^*_{STF}((k-i)\%N)| \quad (9)$$

$\{S_{STF}(k)\}_{k=0}^{N-1}$ represents the frequency domain short training field sequence defined in the IEEE802.15.4/4g standard, and details refer to References 1 to 2; $S_{STF}^*$ is a complex conjugate of $S_{STF}$; and % represents modular arithmetic.

Formula 9 may be equivalent to formula 10.

$$R_l(i) = R_{Y_l, S_{STF}}(i) = \sum_{k=0}^{N-1} |Y_l((k-i)\%N)||S^*_{STF}(k)| \quad (10)$$

The step 1 includes, in a second implementation, performing cyclic shift cross-correlation on an absolute value of the frequency domain sequence of the $l^{th}$ symbol period with an absolute value of a low-complexity sequence corresponding to the frequency domain short training field sequence to obtain a cross-correlation result, as shown in formula 11.

$$R_l(i) = R_{Y_l, I}(i) = \sum_{k=0}^{N-1} |Y_l(k)| \cdot |I^*((k-i)\%N)| \quad (11)$$

$\{I(k)\}_{k=0}^{N-1}$ represents the low-complexity sequence corresponding to the frequency domain short training field sequence, $I^*$ is a complex conjugate of I, and % represents modular arithmetic; and I(j) is defined to be 1 at a $j^{th}$ sub-carrier index with a non-zero value in the frequency domain short training field sequence, otherwise I(j) is defined to be 0, as shown in the following formula.

$$I(j) = \begin{cases} 1, & \text{if } j = D \cdot i, \text{ and } i = 1, ... (N/D - 1) \\ 0, & \text{others} \end{cases}$$

N represents a number of sub-carriers, which is consistent with the number of samples in the time domain sequence of the $l^{th}$ symbol period; and D represents an interval between the sub-carriers at which the frequency domain short training field sequence that non-zero values are located.

Formula 11 may be equivalent to formula 12.

$$R_l(i) = R_{Y_l, I}(i) = \sum_{k=0}^{N-1} |Y_l((k-i)\%N)| \cdot |I^*(k)| \quad (12)$$

The step 1 includes, in a third implementation, performing cyclic shift cross-correlation on a square absolute value of the frequency domain sequence of the $l^{th}$ symbol period with an absolute value of the frequency domain short training field sequence to obtain a cross-correlation result, as shown in formula 13.

$$R_l(i) = R_{Y_l^2, S_{STF}}(i) = \sum_{k=0}^{N-1} |Y_l(k)|^2 |S^*_{STF}((k-i)\%N)| \quad (13)$$

Formula 13 may be equivalent to formula 14.

$$R_l(i) = R_{Y_l^2, S_{STF}}(i) = \sum_{k=0}^{N-1} |Y_l((k-i)\%N)|^2 |S^*_{STF}(k)| \quad (14)$$

The step 1 includes, in a fourth implementation, performing cyclic shift cross-correlation on a square absolute value of the frequency domain sequence of the $l^{th}$ symbol period with an absolute value of a low-complexity sequence corresponding to the frequency domain short training field sequence to obtain a cross-correlation result, as shown in formula 15.

$$R_l(i) = R_{Y_l^2, I}(i) = \sum_{k=0}^{N-1} |Y_l(k)|^2 |I^*((k-i)\%N)| \quad (15)$$

Formula 15 may be equivalent to formula 16.

$$R_l(i) = R_{Y_l^2, I}(i) = \sum_{k=0}^{N-1} |Y_l((k-i)\%N)|^2 |I^*(k)| \quad (16)$$

In the embodiment, the step 2 may be implemented in the following ways, including but being not limited to: in a first implementation, when $N_S=1$, a sequence $\{R_l(i)\}_{i \in N_{AR}}$ exists in the cross-correlation result set, l=m, if a peak value of the sequence $\{R_l(i)\}_{i \in N_{AR}}$ is greater than a first threshold value $T_1$, then a detection result of the short training field signal is indicated to be 1, and it is determined that an expected short training field signal is detected, as shown in formula 17.

$$\text{detection result of short training field signal} = \begin{cases} 1, & \max_{i \in N_{AR}} R_l(i) \geq T_1 \\ 0, & \text{others} \end{cases} \quad (17)$$

The first threshold value $T_1$ may be set to be a constant, and may also be adaptively adjusted according to the frequency domain sequence $\{Y_l(k)\}_{k=0}^{N-1}$ of the $l^{th}$ symbol period.

When the first implementation is selected for the step 1, the first threshold value $T_1$ may be set as shown in formula 18.

$$T_1 = T_{Y_l, STF} = \frac{K_{STF} \cdot A_{STF}}{N} \sum_{k=0}^{N-1} |Y_l(k)| \quad (18)$$

$A_{STF}$ is an amplitude of the sub-carrier of the short training field signal in the frequency domain sequence, and $K_{STF}$ is a preset scaling constant. A setting method includes but is not limited to setting some values according to a usage scenario, and then finding out the optimal first threshold value $T_1$ through simulation, wherein a corresponding value may be set to be the scaling constant $K_{STF}$.

When the second implementation is selected for the step 1, the first threshold value $T_1$ may be set as shown in formula 19.

$$T_1 = T_{Y_l, I} = \frac{K_{STF}}{N} \sum_{k=0}^{N-1} |Y_l(k)| \quad (19)$$

When the third implementation is selected for the step 1, the first threshold value $T_1$ may be set as shown in formula 20.

$$T_1 = T_{Y_l^2, S_{STF}} = \frac{K_{STF} \cdot A_{STF}}{N} \sum_{k=0}^{N-1} |Y_l(k)|^2 \quad (20)$$

When the fourth implementation is selected for the step 1, the first threshold value $T_1$ may be set as shown in formula 21.

$$T_1 = T_{Y_l^2, I} = \frac{K_{STF}}{N} \sum_{k=0}^{N-1} |Y_l(k)|^2 \quad (21)$$

A location of the peak value of the sequence $\{R_l(i)\}_{i \in N_{AR}}$ is indicated as formula 22.

$$\hat{f}_{int} = \arg\max_{i \in N_{AR}} R_l(i) \quad (22)$$

The rough frequency offset estimation value is $f_{int} \cdot \Delta f$, and $\Delta f$ represents the frequency interval between two adjacent sub-carriers of the frequency domain short training field sequence.

In a second implementation of the Step 2, when $N_S > 1$, $N_S$ sequences $\{R_l(i)\}_{i \in N_{AR}}$ exist in the cross-correlation result set, and a peak value $$\max_{i \in N_{AR}} R_l(i)$$

of each sequence is sequentially compared with a first threshold value $T_{l,1}$ of a corresponding symbol period, and when the peak value $$\max_{i \in N_{AR}} R_l(i)$$

is greater than the first threshold value $T_{l,1}$ for the first time, then it is determined that an expected short training field signal is detected; and the first threshold value $T_{l,1}$ is adaptively adjusted according to a frequency domain sequence $\{Y_l(k)\}_{k=0}^{N-1}$ of the $l^{th}$ symbol period. Details refer to setting of $T_1$ in the first implementation of the step 2.

A location of the peak value at which the peak value $$\max_{i \in N_{AR}} R_l(i)$$

is greater than the first threshold value $T_{l,1}$ each time is recorded, as shown in formula 23.

$$\hat{f}_{l,int} = \arg\max_{i \in N_{AR}} R_l(i) \quad (23)$$

Locations of all recorded peak values are averaged to obtain $\hat{f}_{int}$, the rough frequency offset estimation value is $\hat{f}_{int} \cdot \Delta f$, and $\Delta f$ represents the frequency interval between two adjacent sub-carriers of the frequency domain short training field sequence.

In a third implementation of the step 2, in the step 2, cross-correlation results of the $i^{th}$ element corresponding to $N_S$ sequences $\{R_l(i)\}_{i \in N_{AR}}$ in the cross-correlation result set are averaged to obtain an average cross-correlation result sequence $\{R_{m,N_S}(i)\}_{i \in N_{AR}}$, as shown in formula 24.

$$R_{m,N_S}(i) = \frac{\sum_{l=m}^{m+N_S-1} R_l(i)}{N_S} \tag{24}$$

If a peak value of the sequence $\{R_{m,N_S}(i)\}_{i \in N_{AR}}$ is greater than a first threshold value $T_1$, then a detection result of the short training field signal is indicated to be 1, and it is determined that an expected short training field signal is detected, as shown in formula 25.

detection result of short training field signal = $\tag{25}$ $$\begin{cases} 1, \max_{i \in N_{AR}} R_{m,N_S}(i) \geq T_1 \\ 0, \text{others} \end{cases}$$

The first threshold value $T_1$ may be set to be a constant, and may also be adaptively adjusted according to the frequency domain sequence $\{Y_l(k)\}_{k=0}^{N-1}$ of $N_S$ symbol periods.

When the first implementation is selected for the step 1, the first threshold value $T_1$ may be set as shown in formula 26.

$$T_1 = T_{Y_l,STF} = \frac{K_{STF} \cdot A_{STF}}{N \cdot N_S} \sum_{l=m}^{m+N_S-1} \sum_{k=0}^{N-1} |Y_l(k)| \tag{26}$$

$A_{STF}$ is an amplitude of the sub-carrier of the short training field signal in the frequency domain sequence, and $K_{STF}$ is a preset scaling constant. A setting method includes but is not limited to setting some values according to a usage scenario, and then finding out the optimal first threshold value $T_1$ through simulation, wherein a corresponding value may be set to be the scaling constant $K_{STF}$.

When the second implementation is selected for the step 1, the first threshold value $T_1$ may be set as shown in formula 27.

$$T_1 = T_{Y_l,J} = \frac{K_{STF}}{N \cdot N_S} \sum_{l=m}^{m+N_S-1} \sum_{k=0}^{N-1} |Y_l(k)| \tag{27}$$

When the third implementation is selected for the step 1, the first threshold value $T_1$ may be set as shown in formula 28.

$$T_1 = T_{Y_l^2,S_{STF}} = \frac{K_{STF} \cdot A_{STF}}{N \cdot N_S} \sum_{l=m}^{m+N_S-1} \sum_{k=0}^{N-1} |Y_l(k)|^2 \tag{28}$$

When the fourth implementation is selected for the step 1, the first threshold value $T_1$ may be set as shown in formula 29.

$$T_1 = T_{Y_l^2,J} = \frac{K_{STF}}{N \cdot N_S} \sum_{l=m}^{m+N_S-1} \sum_{k=0}^{N-1} |Y_l(k)|^2 \tag{29}$$

A location of the peak value of the sequence $\{R_{m,N_S}(i)\}_{i \in N_{AR}}$ is shown in the formula 30.

$$\hat{f}_{int} = \arg\max_{i \in N_{AR}} R_{m,N_S}(i) \tag{30}$$

The rough frequency offset estimation value is $\hat{f}_{int} \cdot \Delta f$, and $\Delta f$ represents the frequency interval between two adjacent sub-carriers of the frequency domain short training field sequence.

In the embodiment, the step 4 includes multiplying the complex sequence of the $l^{th}$ symbol period with a complex conjugate of a frequency domain long training field sequence, as shown in formula 31.

$$R_{Y_l,S_{LTF}}(k) = Y_l(k)S_{LTF}^*(k), k=0,1,\ldots,N-1 \tag{31}$$

$\{S_{LTF}(k)\}_{k=0}^{N-1}$ is the frequency domain long training field sequence, and $S_{LTF}^*$ is the complex conjugate of $S_{LTF}$.

An inverse discrete Fourier transform operation is performed on a result $\{R_{Y_l,S_{LTF}}(k)\}_{k=0}^{N-1}$ of the multiply operation above to obtain a corresponding time domain sequence, as shown in formula 32.

$$\hat{r}_l(n) = \frac{1}{\sqrt{N}} \sum_{k=0}^{N-1} R_{Y_l,S_{LTF}}(k) e^{\frac{j2\pi kn}{N}}, n = 0, 1, \ldots, N-1 \tag{32}$$

If a peak value of the sequence $\{|\hat{r}_l(n)|\}_{n=0}^{N-1}$ is greater than a second threshold value $T_{LTF}$, then a detection result of the long training field signal is indicated to be 1, and it is determined that an expected long training field signal is detected, as shown in formula 33.

detection result of long training field signal = $\tag{33}$ $$\begin{cases} 1, \max_{n \in \{0,1,\ldots,N-1\}} |\hat{r}_l(n)| > T_{LTF} \\ 0, \text{others} \end{cases}$$

The second threshold value $T_{LTF}$ may be set to be a constant, and may also be adaptively adjusted according to the frequency domain sequence $\{Y_l(k)\}_{k=0}^{N-1}$ of the $l^{th}$ symbol period.

$$T_{LTF} = \frac{K_{LTF}}{N} \sum_{k=0}^{N-1} |Y_l(k)| \tag{34}$$

$K_{LTF}$ is a preset scaling constant. A setting method includes but is not limited to setting some values according to a usage scenario, and then finding out the second threshold value $T_{LTF}$ through simulation, wherein a corresponding value may be set to be the scaling constant $K_{LTF}$.

A location of the peak value of the sequence $\{|\hat{r}_l(n)|\}_{n=0}^{N-1}$ is a long training field symbol boundary, as shown in formula 35.

$$\text{long training field symbol boundary} = \arg\max_{n \in \{0,1,\ldots,N-1\}} |\hat{r}_l(n)| \quad (35)$$

In the embodiment, the fine frequency offset estimation performed in the step 3 and the channel estimation performed in the step 5 are both calculated by using the prior art known to those skilled in the art.

Figure 5:
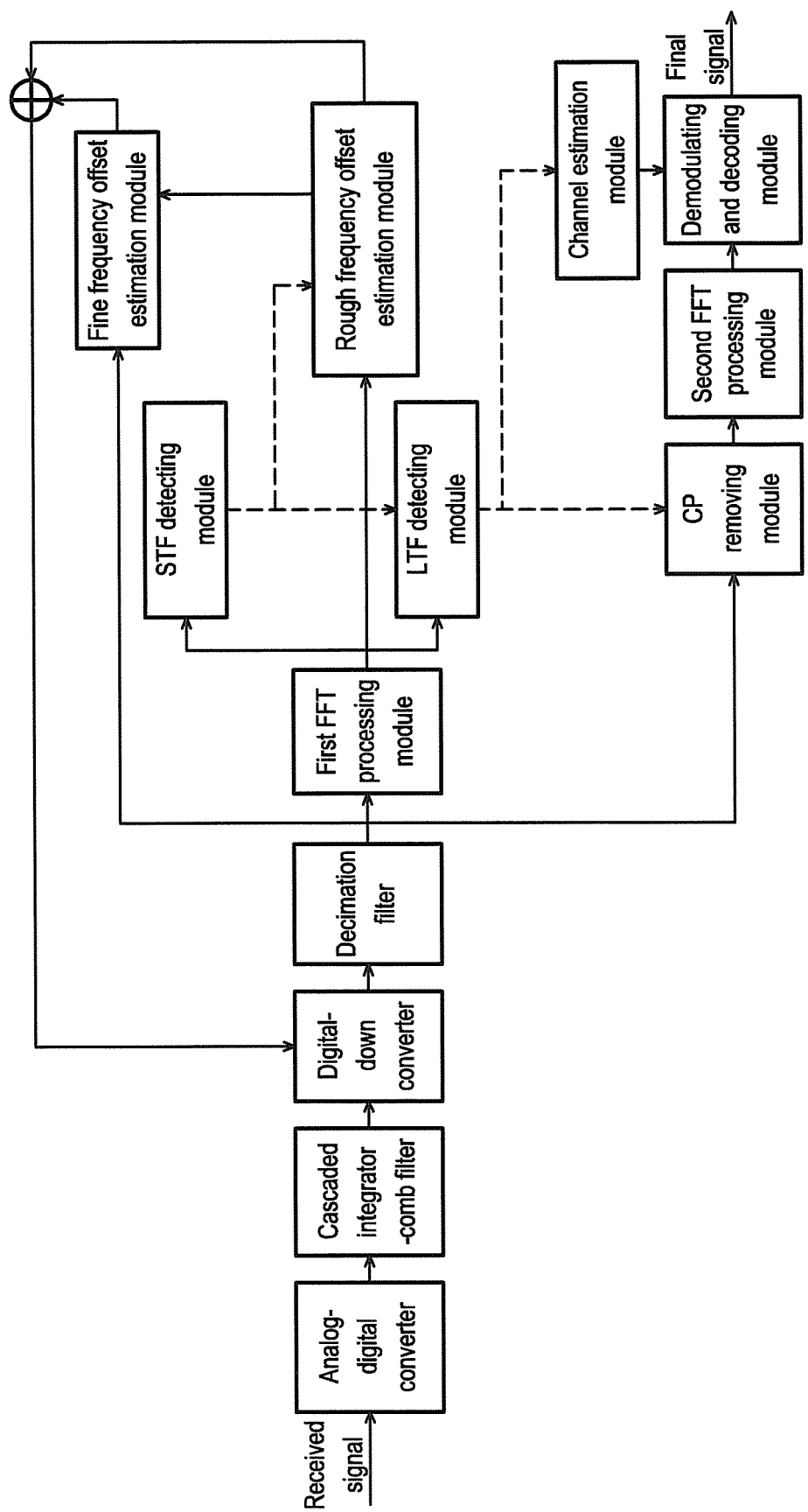
FIG. 5 is a schematic structural diagram of a robust device for estimating frequency offset in orthogonal frequency division multiplexing communication provided by an embodiment of the present application.

As shown in FIG. 5, the second embodiment of the present application discloses the robust device for estimating frequency offset in orthogonal frequency division multiplexing communication, which includes an analog-digital converter, a cascaded integrator-comb filter, a digital-down converter, a decimation filter, a first FFT (Fast Fourier Transform) processing module, a STF detecting module, a rough frequency offset estimation module, a fine frequency offset estimation module, a LTF detecting module, a channel estimation module, a CP removing module, a second FFT processing module and a demodulating and decoding module, wherein the analog-to-digital converter is configured for receiving an OFDM signal and converting the same into a digital signal.

The cascaded integrator-comb filter is configured for filtering and decimating the digital signal to obtain a first decimated signal.

The digital down-converter is configured for converting the first decimated signal into a baseband orthogonal frequency division multiplexing signal by combining frequency offset estimation values sent by the rough frequency offset estimation module and the fine frequency offset estimation module.

The decimation filter is configured for filtering and decimating the baseband orthogonal frequency division multiplexing signal to obtain a second decimated signal.

The first FFT processing module is configured for converting the second decimated signal into a frequency domain sequence; processing the frequency domain sequence and a frequency domain short training field sequence respectively to obtain preprocessed frequency domain sequences, and performing cyclic shift cross-correlation on the preprocessed frequency domain sequences to obtain a cross-correlation result set.

The STF detecting module is configured for detecting a short training field signal according to the cross-correlation result set.

The rough frequency offset estimation module is configured for, when a short training field signal is detected, performing rough frequency offset estimation to obtain a rough frequency offset estimation value; sending the rough frequency offset estimation value to the digital-down converter for frequency offset compensation; and fixing a rough frequency offset estimation value after frequency offset compensation.

The fine frequency offset estimation module is configured for, after performing frequency offset compensation on the rough frequency offset estimation value, performing fine frequency offset estimation to obtain a fine frequency offset estimation value; combining the fixed rough frequency offset estimation value with the fine frequency offset estimation value to obtain a combined frequency offset estimation value; and sending the combined frequency offset estimation value to the digital down-converter for frequency offset compensation.

The LTF detecting module is configured for, after the short training field signal is detected, detecting a long training field signal to obtain a frame boundary.

The channel estimation module is configured for, after the frame boundary is obtained, performing channel estimation to obtain a channel impulse response.

The CP removing module is configured for removing CP from the second decimated signal according to the frame boundary to obtain a first processed signal.

The second FFT processing module is configured for performing FFT transformation on the first processed signal to obtain a frequency domain signal of the first processed signal.

The demodulating and decoding module is configured for, according to the channel impulse response, demodulating and decoding the frequency domain signal of the first processed signal to obtain a final signal; and the final signal includes the physical header and the packet service data unit in Table 1.

The disclosure provides the robust method and device for estimating frequency offset in orthogonal frequency division multiplexing communication, with many methods and ways to realize the technical solution specifically. Those described above are merely the specific implementations of the disclosure, and it should be pointed out that those of ordinary skills in the art may further make several improvements and decorations without departing from the principle of the disclosure, and these improvements and decorations should also be regarded as the scope of protection of the disclosure. All unspecified components in the embodiments may be implemented in the prior art.

What is claimed is:

1. A robust method for estimating frequency offset in orthogonal frequency division multiplexing communication, comprising the following steps of:

step 1: in an initial receiving stage of an orthogonal frequency division multiplexing signal, preprocessing the received signal in $N_S$ symbol periods to obtain $N_S$ corresponding frequency domain sequences, and preprocessing a short training field signal to obtain a frequency domain short training field sequence; and performing cyclic shift cross-correlation on the preprocessed $N_S$ frequency domain sequences with the preprocessed frequency domain short training field sequence respectively to obtain a cross-correlation result set:

$$\{\{R_m(i)\}_{i \in N_{AR}}, \ldots, \{R_l(i)\}_{i \in N_{AR}}, \ldots, \{R_{m+n_S-1}(i)\}_{i \in N_{AR}}\}$$

wherein, l represents an $l^{th}$ symbol period of the initial signal receiving stage, $m \leq l \leq m+N_S-1$, m represents to the first symbol period to perform cyclic shift cross-correlation on the preprocessed frequency domain sequences with the preprocessed frequency domain short training field sequence, and $N_S$ does not exceed a total number of symbols in the initial signal receiving stage; $\{R_l(i)\}_{i \in N_{AR}}$ represents a cross-correlation result sequence of the $l^{th}$ symbol period, and i represents a number of cyclic shifts; $N_{AR}$ represents a range of the cyclic shifts, which is set according to a preset frequency offset acquisition range $F_{AR}$; and l does not exceed the total number of symbols in the initial signal receiving stage;

step 2: according to the cross-correlation result set, detecting a short training field signal; when the short training field signal is detected, performing rough frequency offset estimation to obtain a rough frequency offset estimation value; performing frequency offset compensation according to the rough frequency offset estimation value; and when the short training field signal is not detected, increasing a value of m by 1, and repeating the step 1;

step 3: fixing the rough frequency offset estimation value, performing fine frequency offset estimation to obtain a fine frequency offset estimation value, combining the fixed rough frequency offset estimation value with the fine frequency offset estimation value to obtain a combined frequency offset estimation value, and performing frequency offset compensation according to the combined frequency offset estimation value;

step 4: detecting a long training field signal to obtain a frame boundary; and step 5: performing channel estimation to complete an initialization process of orthogonal frequency division multiplexing signal reception.

2. The robust method for estimating frequency offset in orthogonal frequency division multiplexing communication according to claim 1, wherein in the step 1, a time domain sequence of the $l^{th}$ symbol period is recorded as $\{y_l(n)\}_{n=0}^{N-1}$, which is transformed into a corresponding frequency domain sequence $\{y_l(n)\}_{k=0}^{N-1}$ through discrete Fourier transform, and N represents a number of samples of the time domain sequence of the $l^{th}$ symbol period; and the step 1 comprises: performing cyclic shift cross-correlation on an absolute value of the frequency domain sequence of the $l^{th}$ symbol period with an absolute value of the frequency domain short training field sequence to obtain a cross-correlation result:

$$R_l(i) = R_{Y_l, S_{STF}}(i) = \sum_{k=0}^{N-1} |Y_l(k)||S^*_{STF}((k-i)\%N)|$$

wherein, $\{S_{STF}(k)\}_{k=0}^{N-1}$ represents the frequency domain short training field sequence; $S_{STF}^*$ is a complex conjugate of $S_{STF}$; and % represents modular arithmetic.

3. The robust method for estimating frequency offset in orthogonal frequency division multiplexing communication according to claim 2, wherein in the step 2, when $N_S=1$, a sequence $\{R_m(i)\}_{i \in N_{AR}}$ exists in the cross-correlation result set, if a peak value of the sequence $\{R_m(i)\}_{i \in N_{AR}}$ is greater than a first threshold value $T_1$, then a detection result of the short training field signal is indicated to be 1, and it is determined that an expected short training field signal is detected, which means that:

$$\text{detection result of short training field signal} = \begin{cases} 1, & \max_{i \in N_{AR}} R_m(i) \geq T_1 \\ 0, & \text{others} \end{cases}$$

the first threshold value $T_1$ is adaptively adjusted according to a frequency domain sequence $\{Y_m(k)\}_{k=0}^{N-1}$ of the $m^{th}$ symbol period; and a location of the peak value of the sequence $\{R_m(i)\}_{i \in N_{AR}}$ is indicated as follows:

$$\hat{f}_{\text{int}} = \arg\max_{i \in N_{AR}} R_m(i)$$

the rough frequency offset estimation value is $\hat{f}_{int} \cdot \Delta f$, and $\Delta f$ represents the frequency interval between two adjacent sub-carriers of the frequency domain short training field sequence.

4. The robust method for estimating frequency offset in orthogonal frequency division multiplexing communication according to claim 2, wherein in the step 2, when $N_S>1$, $N_S$ sequences $\{R_l(i)\}_{i \in N_{AR}}$ exist in the cross-correlation result set, and a peak value $\{R_l(i)\}_{i \in N_{AR}}$ of each sequence is sequentially compared with a first threshold value $T_{l,i}$ of a corresponding symbol period, and when the peak value $$\max_{i \in N_{AR}} R_l(i)$$

is greater than the first threshold value $T_{l,1}$ for the first time, then it is determined that an expected short training field signal is detected; the first threshold value $T_{l,1}$ is adaptively adjusted according to a frequency domain sequence $\{Y_l(k)\}_{k=0}^{N-1}$ of the $l^{th}$ symbol period; and a location of the peak value at which the peak value $$\max_{i \in N_{AR}} R_l(i)$$

is greater than the first threshold value $T_{l,1}$ each time is recorded:

$$\hat{f}_{l,\text{int}} = \arg\max_{i \in N_{AR}} R_l(i)$$

locations of all recorded peak values are averaged to obtain $\hat{f}_{int}$, the rough frequency offset estimation value is $\hat{f}_{int} \cdot \Delta f$, and $\Delta f$ represents the frequency interval between two adjacent sub-carriers of the frequency domain short training field sequence.

5. The robust method for estimating frequency offset in orthogonal frequency division multiplexing communication according to claim 2, wherein in the step 2, cross-correlation results of all the $i^{th}$ element corresponding to $N_S$ sequences $\{R_l(i)\}_{i \in N_{AR}}$ in the cross-correlation result set are averaged to obtain an average cross-correlation result sequence $\{R_l(i)\}_{i \in N_{AR}}$:

$$R_{m,N_S}(i) = \frac{\sum_{l=m}^{m+N_S-1} R_l(i)}{N_S}$$

if a peak value of the sequence $\{R_m(i)\}_{i \in N_{AR}}$ is greater than a first threshold value $T_1$, then a detection result of the short training field signal is indicated to be 1, and it is determined that an expected short training field signal is detected, which means that:

$$\text{detection result of short training field signal} = \begin{cases} 1, & \max_{i \in N_{AR}} R_{m,N_S}(i) \geq T_1 \\ 0, & \text{others} \end{cases}$$

the first threshold value $T_1$ is adaptively adjusted according to a frequency domain sequence $\{Y_l(k)\}_{k=0}^{N-1}$ of the $N_S$ symbol periods; and a location of the peak value of the sequence $\{R_m(i)\}_{i \in N_{AR}}$ is indicated as follows:

$$\hat{f}_{int} = \arg\max_{i \in N_{AR}} R_{m,N_S}(i)$$

the rough frequency offset estimation value is $\hat{f}_{int} \cdot \Delta f$, and $\Delta f$ represents the frequency interval between two adjacent sub-carriers of the frequency domain short training field sequence.

6. The robust method for estimating frequency offset in orthogonal frequency division multiplexing communication according to claim 1, wherein in the step 1, a time domain sequence of the $l^{th}$ symbol period is recorded as $\{y_l(n)\}_{n=0}^{N-1}$, which is transformed into a corresponding frequency domain sequence $\{y_l(n)\}_{k=0}^{N-1}$ through discrete Fourier transform, and N represents a number of samples of the time domain sequence of the $l^{th}$ symbol period; and the step 1 comprises: performing cyclic shift cross-correlation on an absolute value of the frequency domain sequence of the $l^{th}$ symbol period with an absolute value of a low-complexity sequence corresponding to the frequency domain short training field sequence to obtain a cross-correlation result:

$$R_l(i) = R_{Y_l, I}(i) = \sum_{k=0}^{N-1} |Y_l(k)| \cdot |I^*((k-i)\%N)|$$

wherein, $\{I(k)\}_{k=0}^{N-1}$ represents the low-complexity sequence corresponding to the frequency domain short training field sequence, $I^*$ is a complex conjugate of I, and % represents modular arithmetic; and I(j) is defined to be 1 at a $j^{th}$ sub-carrier index with a non-zero value in the frequency domain short training field sequence, otherwise I(j) is defined to be 0, which means that, $$I(j) = \begin{cases} 1, & \text{if } j = D \cdot i, \text{ and } i = 1, \ldots (N/D-1) \\ 0, & \text{others} \end{cases}$$

N represents a number of sub-carriers, which is consistent with the number of samples in the time domain sequence of the $l^{th}$ symbol period; and D represents an interval between the sub-carriers at which the frequency domain short training field sequence that non-zero values are located.

7. The robust method for estimating frequency offset in orthogonal frequency division multiplexing communication according to claim 1, wherein in the step 1, a time domain sequence of the $l^{th}$ symbol period is recorded as $\{y_l(n)\}_{n=0}^{N-1}$, which is transformed into a corresponding frequency domain sequence $\{y_l(n)\}_{k=0}^{N-1}$ through discrete Fourier transfoiiii, and N represents a number of samples of the time domain sequence of the $l^{th}$ symbol period; and the step 1 comprises: performing cyclic shift cross-correlation on a square absolute value of the frequency domain sequence of the $l^{th}$ symbol period with an absolute value of the frequency domain short training field sequence to obtain a cross-correlation result:

$$R_l(i) = R_{Y_l^2, STF}(i) = \sum_{k=0}^{N-1} |Y_l(k)|^2 |S_{STF}^*((k-i)\%N)|$$

wherein, $\{S_{STF}(k)\}_{k=0}^{N-1}$ represents the frequency domain short training field sequence; $S_{STF}^*$ is a complex conjugate of $S_{STF}$; and % represents modular arithmetic.

8. The robust method for estimating frequency offset in orthogonal frequency division multiplexing communication according to claim 1, wherein in the step 1, a time domain sequence of the $l^{th}$ symbol period is recorded as $\{y_l(n)\}_{n=0}^{N-1}$, which is transformed into a corresponding frequency domain sequence $\{y_l(n)\}_{k=0}^{N-1}$ through discrete Fourier transform, and N represents a number of samples of the time domain sequence of the $l^{th}$ symbol period; and the step 1 comprises: performing cyclic shift cross-correlation on a square absolute value of the frequency domain sequence of the $l^{th}$ symbol period with an absolute value of a low-complexity sequence corresponding to the frequency domain short training field sequence to obtain a cross-correlation result:

$$R_l(i) = R_{Y_l^2, I}(i) = \sum_{k=0}^{N-1} |Y_l(k)|^2 |I^*((k-i)\%N)|$$

wherein, $\{I(k)\}_{k=0}^{N-1}$ represents the low-complexity sequence corresponding to the frequency domain short training field sequence, $I^*$ is a complex conjugate of I, and % represents modular arithmetic; and I(j) is defined to be 1 at a $j^{th}$ sub-carrier index with a non-zero value in the frequency domain short training field sequence, otherwise I(j) is defined to be 0, which means that, $$I(j) = \begin{cases} 1, & \text{if } j = D \cdot i, \text{ and } i = 1, \ldots (N/D-1) \\ 0, & \text{others} \end{cases}$$

N represents a number of sub-carriers, which is consistent with the number of samples in the time domain sequence of the $l^{th}$ symbol period; and D represents an interval between the sub-carriers at which the frequency domain short training field sequence that non-zero values are located.

9. The robust method for estimating frequency offset in orthogonal frequency division multiplexing communication according to claim 1, wherein a time domain sequence of the $l^{th}$ symbol period is recorded as $\{y_l(n)\}_{n=0}^{N-1}$, which is transformed into a corresponding frequency domain sequence $\{y_l(n)\}_{k=0}^{N-1}$ through discrete Fourier transforms, and N represents a number of samples of the time domain sequence of the $l^{th}$ symbol period; and the step 4 comprises:

multiplying the complex frequency domain sequence of the $l^{th}$ symbol period with a complex conjugate of a frequency domain long training field sequence:

$$R_{Y_l, S_{LTF}}(k) = Y_l(k) S_{LTF}^*(k), k = 0, 1, \ldots, N-1$$

wherein, $\{S_{LTF}(k)\}_{k=0}^{N-1}$ represents the frequency domain long training field sequence, and $S_{LTF}^*$ is a complex conjugate of $S_{LTF}$; and performing an inverse discrete Fourier transform operation on a result $\{R_{Y_l, S_{LTF}}(k)\}_{k=0}^{N-1}$ of the multiply operation above to obtain a corresponding time domain sequence:

$$\hat{r}_l(n) = \frac{1}{\sqrt{N}} \sum_{k=0}^{N-1} R_{Y_l, S_{LTF}}(k) e^{\frac{j2\pi kn}{N}}, n = 0, 1, \ldots, N-1$$

if a peak value of the sequence $\{|\hat{r}_l(n)|\}_{n=0}^{N-1}$ is greater than a second threshold value $T_{LTF}$, then a detection result of the long training field signal is indicated to be 1, and it is determined that an expected long training field signal is detected, which means that:

detection result of long training field signal =

$$\begin{cases} 1, & \max_{n \in \{0,1,\ldots,N-1\}} |\hat{r}_l(n)| > T_{LTF} \\ 0, & \text{others} \end{cases}$$

the second threshold value $T_{LTF}$ is adaptively adjusted according to a frequency domain sequence $\{Y_l(k)\}_{k=0}^{N-1}$ of the $l^{th}$ symbol period; and a location of the peak value of the sequence $\{|\hat{r}_l(n)|\}_{n=0}^{N-1}$ is a long training field symbol boundary, indicated as follows:

$$\text{long training field symbol boundary} = \arg\max_{n \in \{0,1,\ldots,N-1\}} |\hat{r}_l(n)|.$$

10. A robust device for estimating frequency offset in orthogonal frequency division multiplexing communication, comprising an analog-digital converter, a cascaded integrator-comb filter, a digital-down converter, a decimation filter, a first Fast Fourier Transform (FFT) processing module, a Short Training Field (STF) detecting module, a rough frequency offset estimation module, a fine frequency offset estimation module, a Long Training Field (LTF) detecting module, a channel estimation module, a Cyclic Prefix (CP) removing module, a second FFT processing module and a demodulating and decoding module, wherein, the analog-to-digital converter is configured for receiving an Orthogonal Frequency Division Multiplexing (OFDM) signal and converting the same into a digital signal;

the cascaded integrator-comb filter is configured for filtering and decimating the digital signal to obtain a first decimated signal;

the digital down-converter is configured for converting the first decimated signal into a baseband orthogonal frequency division multiplexing signal by combining frequency offset estimation values sent by the rough frequency offset estimation module and the fine frequency offset estimation module;

the decimation filter is configured for filtering and decimating the baseband orthogonal frequency division multiplexing signal to obtain a second decimated signal;

the first FFT processing module is configured for converting the second decimated signal into a frequency domain sequence; preprocessing the frequency domain sequence and a frequency domain short training field sequence, respectively, and performing cyclic shift cross-correlation on the preprocessed sequences to obtain a cross-correlation result set;

the Short Training Field (STF) detecting module is configured for detecting a short training field signal according to the cross-correlation result set;

the rough frequency offset estimation module is configured for, when a short training field signal is detected, performing rough frequency offset estimation to obtain a rough frequency offset estimation value; sending the rough frequency offset estimation value to the digital-down converter for frequency offset compensation; and fixing a rough frequency offset estimation value after frequency offset compensation;

the fine frequency offset estimation module is configured for, after performing frequency offset compensation on the rough frequency offset estimation value, performing fine frequency offset estimation to obtain a fine frequency offset estimation value; combining the fixed rough frequency offset estimation value with the fine frequency offset estimation value to obtain a combined frequency offset estimation value; and sending the combined frequency offset estimation value to the digital down-converter for frequency offset compensation;

the LTF detecting module is configured for, after the short training field signal is detected, detecting a long training field signal to obtain a frame boundary;

the channel estimation module is configured for, after the frame boundary is obtained, performing channel estimation to obtain a channel impulse response;

the CP removing module is configured for removing CP from the second decimated signal according to the frame boundary to obtain a first processed signal;

the second FFT processing module is configured for performing FFT transformation on the first processed signal to obtain a frequency domain signal of the first processed signal; and the demodulating and decoding module is configured for, according to the channel impulse response, demodulating and decoding the frequency domain signal of the first processed signal to obtain a final signal.

\* \* \* \* \*